Feb. 16, 1932. W. T. NORTON 1,845,678
VEHICLE
Filed June 28, 1929  5 Sheets-Sheet 1
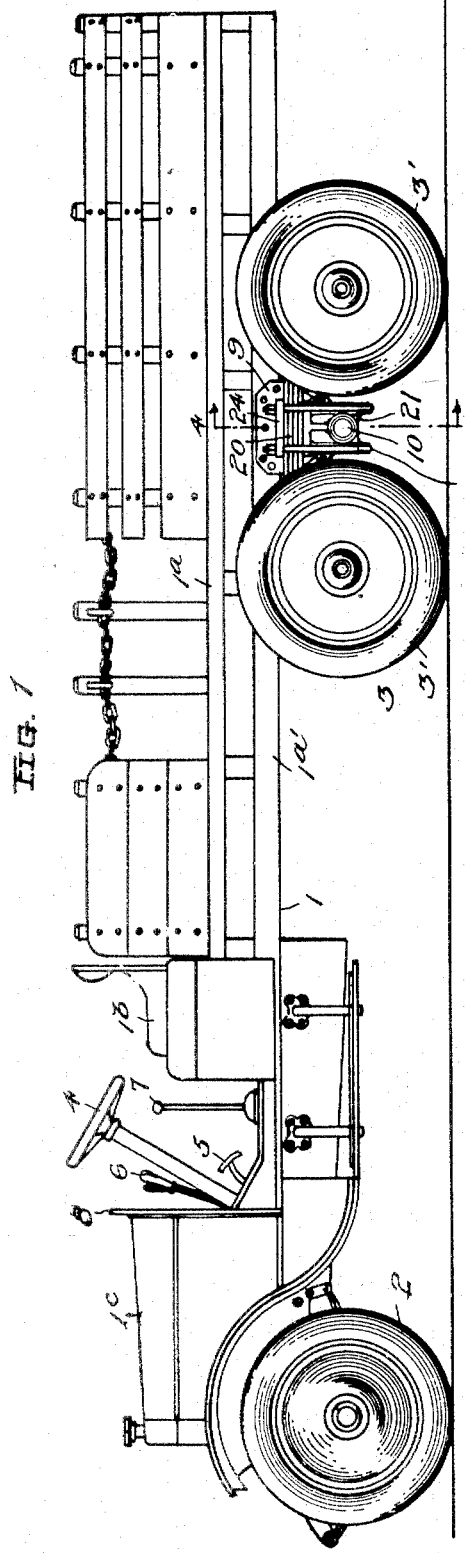
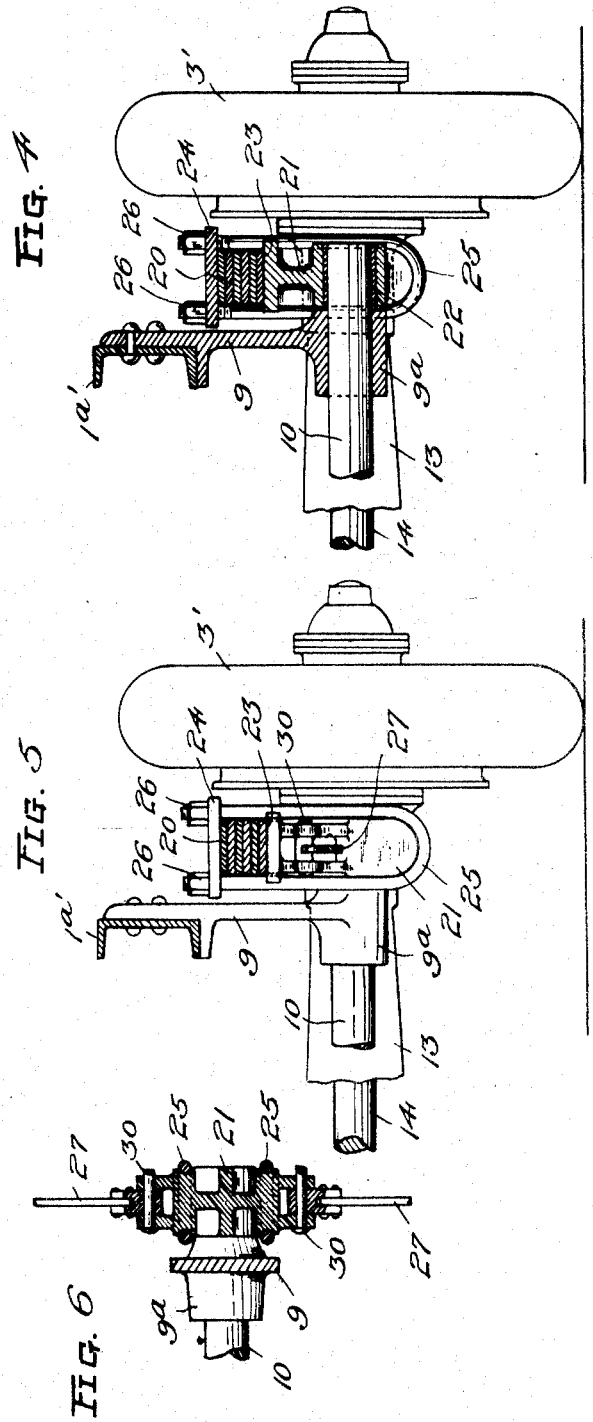
INVENTOR
William T. Norton

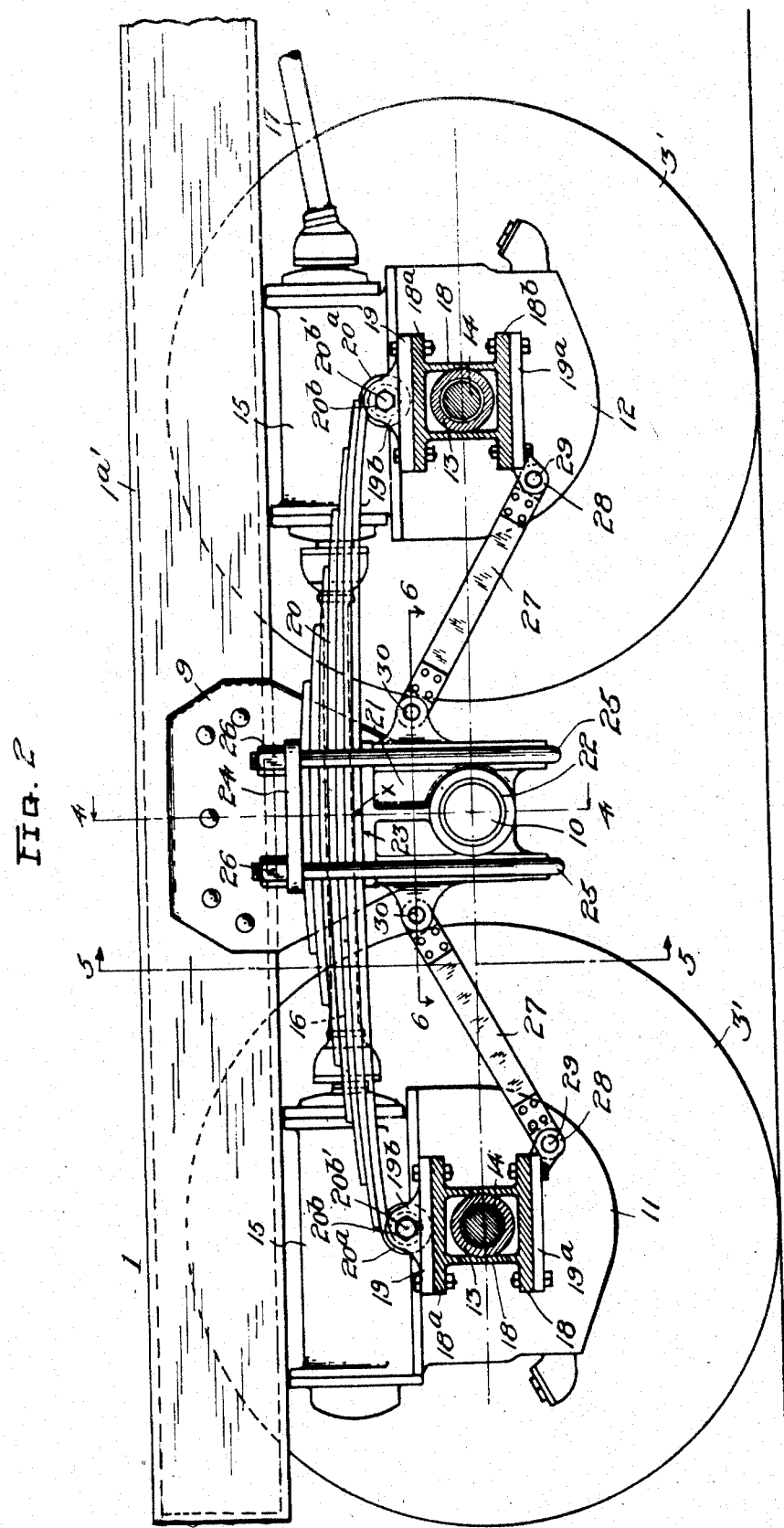

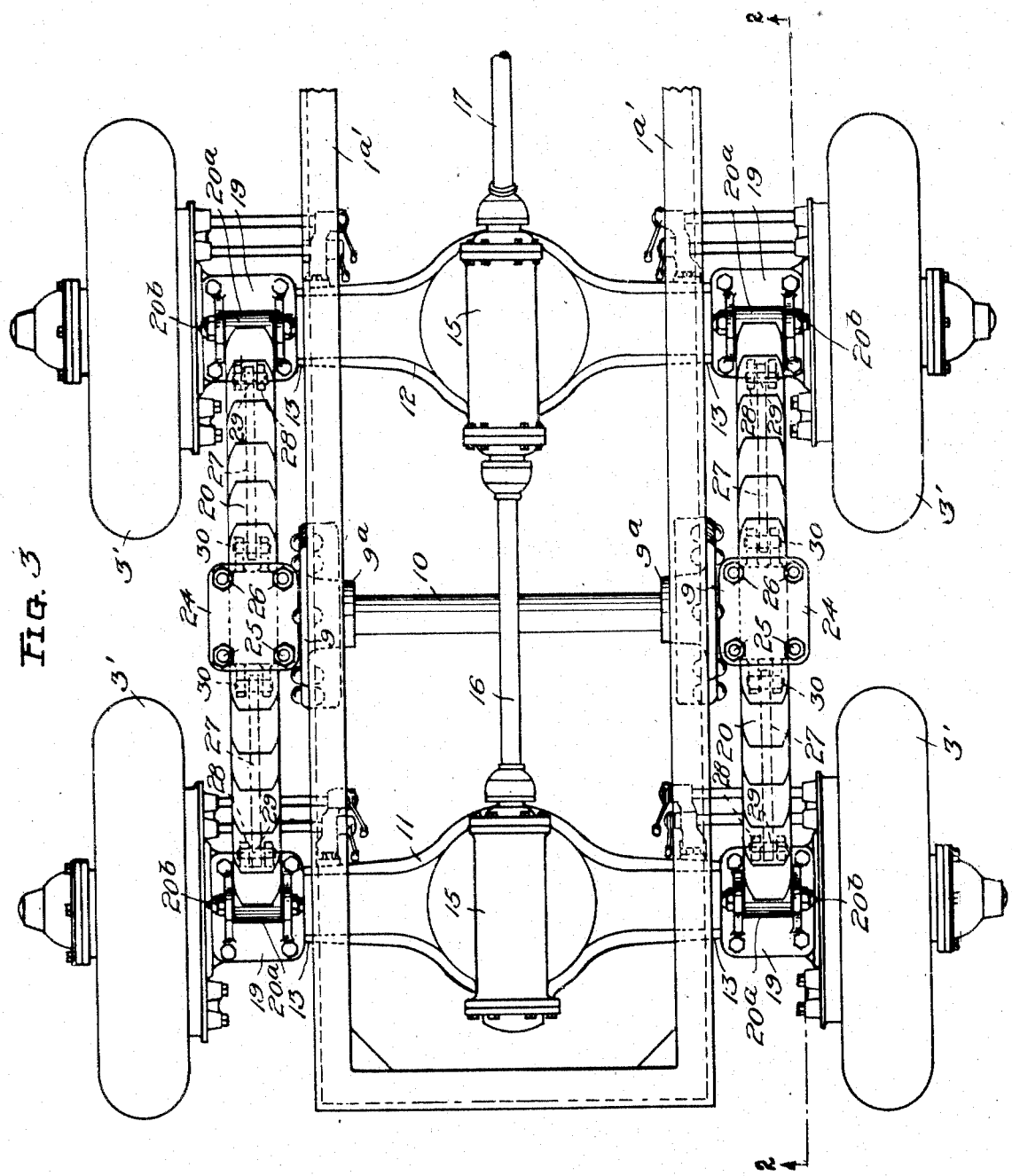

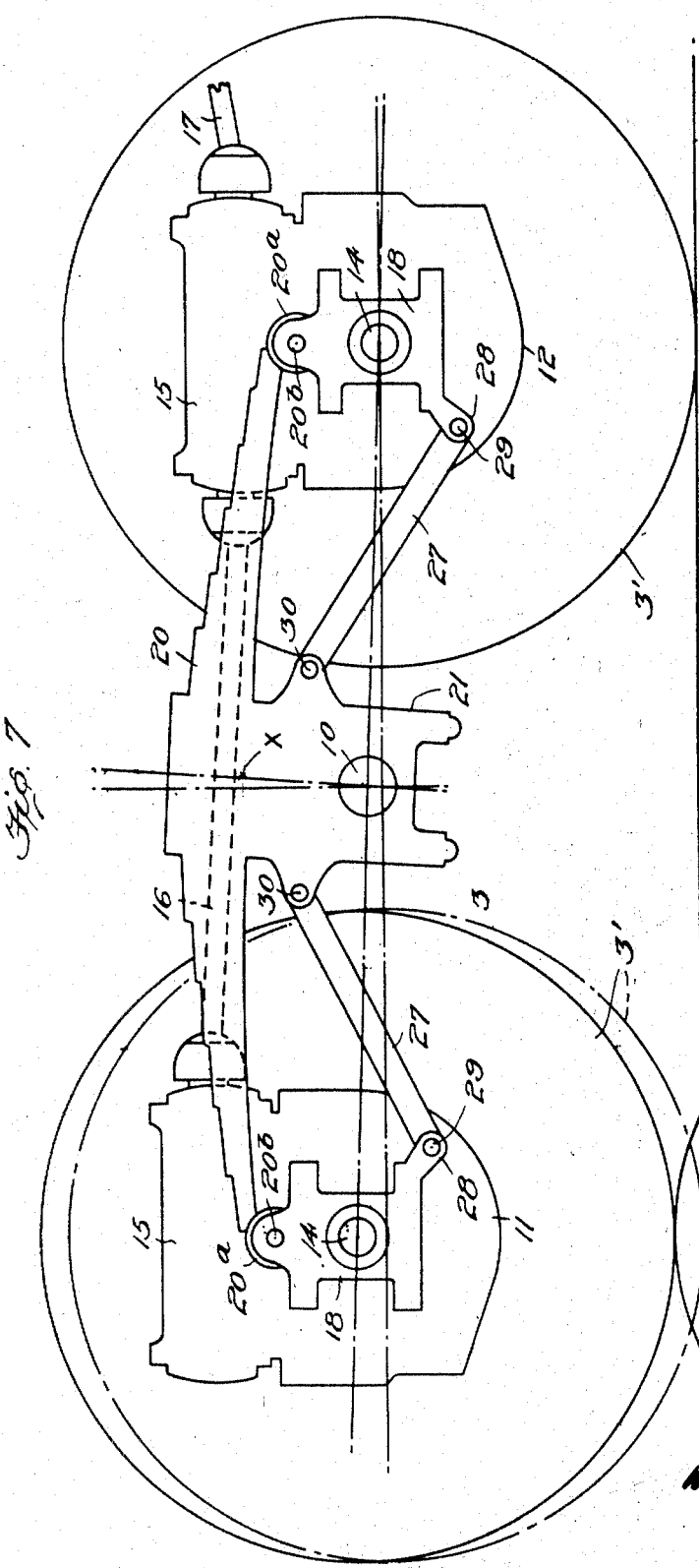

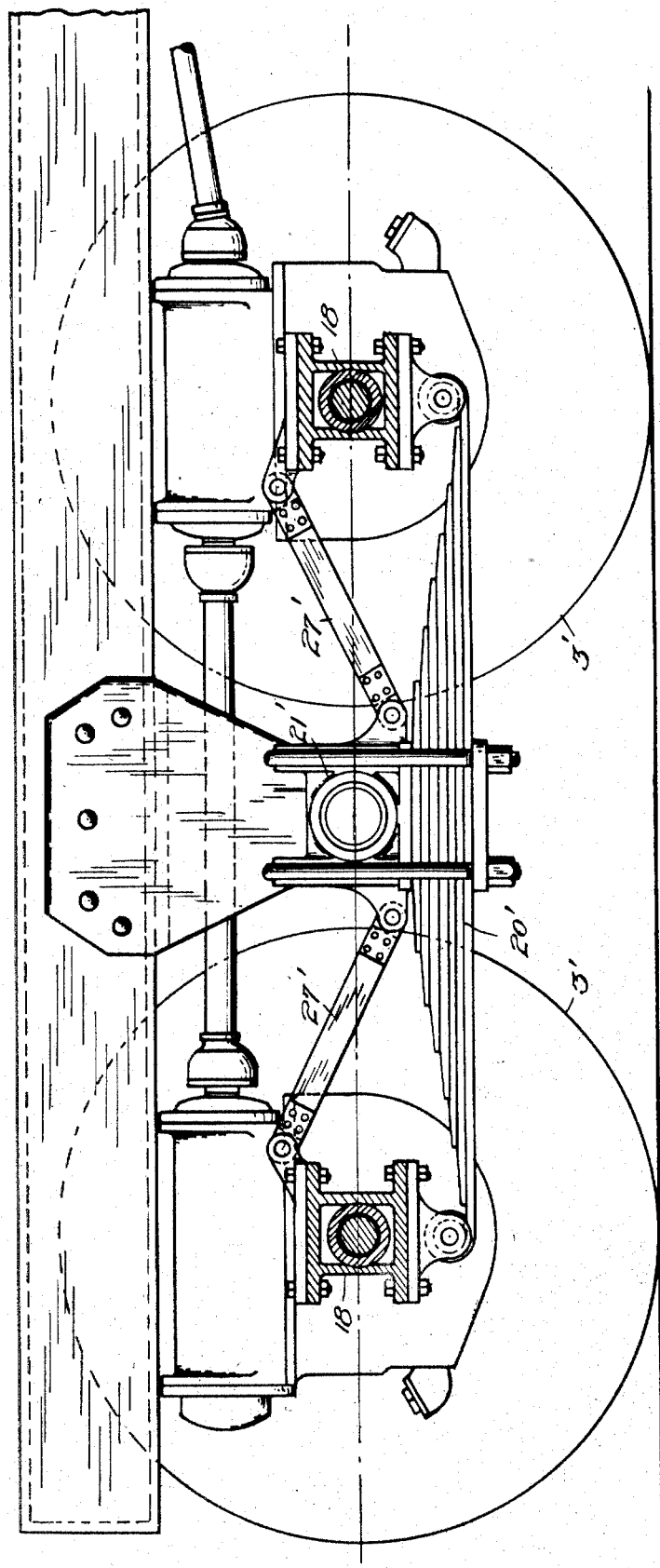

Patented Feb. 16, 1932

1,845,678

UNITED STATES PATENT OFFICE

WILLIAM T. NORTON, OF LAKEWOOD, OHIO; MILDRED F. W. NORTON ADMINISTRATRIX OF SAID WILLIAM T. NORTON, DECEASED

VEHICLE

Application filed June 28, 1929. Serial No. 374,429.

This invention relates to a self propelled vehicle, more particularly to a vehicle having a multi-driven axle mechanism. While my invention is applicable to vehicles which run on tracks, it is shown herein as applied to a vehicle of the automobile type, the invention being especially advantageous or useful where the vehicle is intended to carry a large number of passengers or relatively heavy loads, the latter type being shown for illustrative purposes.

One object of the invention is to provide an improved duplex or multi-drive axle mechanism wherein the axle housings are supported by and trunnioned on a transverse shaft between them in such manner that the connecting members between such housings and the trunnions serve (1) to take up all torque re-action and (2) as the connection between the drive wheels or the axle housings therefor and the vehicle frame, to impart movement to the latter over the ground.

Another object of the invention is to provide in a duplex or multi-drive axle mechanism for a vehicle trunnioned on the vehicle frame, improved compensating means for the axle housings whereby the latter are maintained at all times in a predetermined relation to their respective driving elements, while permitting the wheels or any thereof to ride uneven surfaces, thus insuring continuous driving between the driving and driven elements and continuous tractive effort between the wheels and ground.

Another object of the invention is to provide an improved duplex or multi-drive axle mechanism wherein the axes of the pairs of drive wheels and the axis of the trunnion between the axle housings are disposed in the same horizontal plane, whereby tendency of the forward pair of wheels driven by said mechanism, in either direction of movement of the vehicle, to disengage the ground, due to the propelling effort or force of the rearward pair of wheels, is eliminated. This construction therefore insures that all of the wheels will maintain uniform traction engagement or effort with the ground, which is particularly advantageous in the event the front wheels of the vehicle meet with any undue resistance.

Another object of the invention is to provide a duplex or multi-drive axle mechanism having relatively simple means for effecting compensation of the axle housings as the drive wheels traverse uneven surfaces, whereby the axle housings are maintained in driving relation to the driving means and torque induced by the weight of the load or by the unevenness of the ground on the axle housings is eliminated.

Other objects of the invention will be apparent to those skilled in the art to which my invention relates from the following description taken in connection with the accompanying drawings, wherein Fig. 1 is a side elevation of a vehicle embodying my invention.

Fig. 2 is a fragmentary sectional view on the line 2—2 of Fig. 3; the wheels being shown in outline.

Fig. 3 is a plan of a portion of the vehicle including the duplex drive axle mechanism; being a plan view of the parts shown in Fig. 2.

Fig. 4 is a section on the line 4—4 of Figs. 1 and 2.

Fig. 5 is a section on the line 5—5 of Fig. 2.

Fig. 6 is a section on the line 6—6 of Fig. 2.

Fig. 7 is a diagrammatic view of the parts shown in Fig. 2, but showing them in the position they assume when one pair of wheels rides an obstruction.

Fig. 8 is a fragmentary side elevation similar to Fig. 2, but showing a different embodiment of my invention.

In the drawings, 1 indicates a frame of suitable construction, herein illustrated by way of example as a cargo carrying type of vehicle. The frame 1 is constructed to provide a load carrying portion 1a, a driver's seat 1b and a hood 1c, the latter enclosing the usual or any desired propelling motor (not shown). The frame 1 may comprise a pair of sills 1a', preferably comprising channel bars, connected in spaced relation in any desired manner.

2 indicates a pair of front wheels (one only being shown) steerably connected to the frame 1 in a well known manner. 3 indicates as an entirety a duplex drive axle mechanism (hereinafter described) for driving two pairs of traction wheels 3′, this mechanism being arranged below the load carrying portion 1a of the frame 1, and connected thereto in the manner to be later set forth.

4 indicates a suitable steering device for steering the wheels 2. 5 indicates a suitable service brake pedal. 6 indicates a suitable emergency brake. 7 indicates a suitable shift lever. Other control or operating devices (not shown) may be mounted on the dash 8.

9 indicates a pair of brackets rigidly secured to the sills 1a′ and depending therefrom, their lower ends being provided with sleeves 9a in which is supported the outer end portions of a shaft 10, the ends of the latter extending beyond the sleeves 9a and forming trunnions for the duplex drive axle mechanism 3, whereby the pairs of wheels 3′ thereof may accommodate themselves to uneven surfaces as the vehicle is driven. As more clearly shown in Fig. 2, the brackets 9 depend downwardly far enough to dispose the axis of the shaft 10 in the horizontal plane cutting the axes of the wheels 3′, so that the up and down movement of either wheel or either pair of wheels when riding an uneven surface, is substantially vertical, with the result that compensating action is materially simplified, as will later appear. In this arrangement, tendency of the forward pair of wheels 3′ to disengage the ground, particularly when the front wheels 2 meet with an obstruction, due to the driving effort of the rearward pair of wheels 3′, is eliminated, since the forward impelling movement of the rearward wheels is in line with the axis of the trunnions 10; likewise, in driving the vehicle backwardly, any tendency for the then forward wheels 3′ to disengage the ground due to the driving effort of the other (then rearward) pair of wheels is eliminated. This advantage is particularly true in the form of construction shown in Figs. 1 to 6, inclusive, where the propelling connections for the frame between the axle housings and trunnioned supports are above these axes. Of the drive axle mechanism, 11, 12, indicate axle housings enclosing suitable power transmitting devices of the well known differential type, each of these housings terminating at their opposite ends in tubular members 13 through which extend the axle sections 14 driven by the differential mechanism, the axle sections being connected in any desired manner with the adjacent wheels 3′. The axle sections 14 may be of the full floating type. The ring gear of each differential mechanism is preferably driven by a worm suitably mounted within a housing member 15 related and secured to the adjacent housing 11 or 12 in any desired manner. The driving worm of the outer power transmitting devices is connected to a propeller shaft section 16, which in turn is connected to the worm of the inner power transmitting devices, and the latter worm is connected to a propeller shaft 17; the latter shaft being driven in the usual manner by the propelling motor to which reference has already been made. From the foregoing description it will be noted that in the illustrated construction the propelling motor operates through the shaft 17, to drive the worm of the inner power transmitting devices and this worm operates through the shaft 16 to drive the worm of the rear or outer power transmitting devices, whereby the axle sections 14 for both pairs of wheels 3′ are driven, but it will be understood that this arrangement is merely for purposes of illustration, as the pairs of wheels 3′ may be otherwise driven, if desired. 18 indicates bolsters mounted on and rigidly secured to the outer portions of the tubular members 13. Each bolster comprises side walls and top and bottom bases 18a, 18b, respectively, to which are bolted or otherwise secured connecting elements 19, 19a, respectively. 20 indicates a pair of members each connected at its opposite outer or free ends to the connecting elements 19 on the bolsters carried by the tubular members 13 at either side of the axle mechanism 3 and rotatably connected to or trunnioned midway of its ends on the adjacent end of the shaft 10. The purpose of the members 20 is to provide a connection between the axle housings 11, 12, and the trunnions 10, whereby the axle mechanism 3 may rock about a transverse axis to permit the wheels of each pair to ride obstructions and depressions independently of the other wheels. The members 20 also serve (1) as torque re-action rods for the axle housings and (2) as connectors between the axle housings and the frame to impart movement to the latter over the ground. The combined torque re-action and connecting members 20 are preferably resilient and in carrying out such preferred form of construction I utilize suitable leaf springs, as shown. Each spring 20 consists of a plurality of leaves the lowermost one being connected at its free ends to the connecting elements 19 in the following manner: the free ends of the lowermost leaf is bent to form journals 20a through each of which extends a pivot pin 20b. Each pin 20b is supported at its opposite ends in upstanding ears 19b provided on the adjacent plate 19, this form of construction serving to pivotally connect the spring 20 at its opposite ends to the adjacent tubular members 13. Each pin 20b is supported or arranged so that its axis 20b′ lies in a vertical plane cutting the axis of the adjacent pair of wheels 3′. Each pin 20b is preferably held in position in the ears 19b by bolts threaded on its opposite ends and engaging the outer sides of the ears.

The connection between the center portion of each spring 20 and the shaft 10, whereby it may trunnion on the latter, consists of a support 21 having a bearing opening 22 into which the adjacent end of the shaft 10 rotatably fits and a relatively long seat 23 to which the spring 20 is rigidly secured. The means for securing the spring 20 to its seat preferably consists of a plate 24 engaging the upper side of the spring and a pair of U-devices 25 which encircle the support 21, fitting grooves formed in the latter, the free ends of the devices extending through openings formed in the plates 24 to take nuts 26, which, when tightened, clamp the plate 24 and through the latter rigidly secure the spring to the support 21.

27 indicates a pair of compensating devices connected at their inner ends to each support 21 and at their outer ends to the adjacent connecting elements 19a secured to the bolsters 18 and through the latter to the axle housings 11, 12. Each pair of compensating devices 27 is preferably arranged in the vertical plane of the adjacent connector 20, so that when one wheel rides an unevenness in the ground and causes a partial rotation of the support 21, as shown in full lines in Fig. 7, the adjacent compensating devices 27 will operate in direct opposition to the adjacent member 20 to prevent torque movement of the axle housings.

The outer end of each compensating device 27 is preferably formed with an opening and disposed between lugs 28 provided on the inner edge of the adjacent connecting element 19a, these lugs being formed with openings through which, and the opening in the device 27, extends a pivot 29 to pivotally connect the device 27 to the bolster and hence indirectly connect it to the adjacent axle housing. The connection for the outer end of each device 27 with the bolster is disposed a distance from the axis of the adjacent wheel approximately equal to the distance the connection of the connector with the bolster is from the same wheel axis.

The inner end of each compensating device is, by preference connected to the adjacent support 21 in a similar manner, the pivot pin for such connection being designated 30. As shown, in Fig. 2, the compensating devices 27 are (1) connected to the support above the plane cutting the axes of the shaft 10 and wheels 3' and (2) connected to the bolsters 18 below this plane, so that the trunnioning of the support 21 in either direction will effect corresponding compensating, re-action on the axle housings in the opposite direction, one device causing a thrust movement on the adjacent bolster and the other device causing a pulling movement on the adjacent bolster. Also, as shown in the drawings (more clearly in Fig. 2), the axis of the pivotal connections for the inner ends of compensating devices 27, that is, the axes of the pins 30, and the axis of the trunnion 10 are disposed substantially an equal distance from an imaginary point, which I have marked $x$, disposed in the vertical plane cutting the axis of the trunnion or shaft 10, when the support 21 is in normal or mid-position, and also equal distances from the radius of the point $x$. In other words, the axes of the pins 30 and point $x$ lie in an arc struck from the axis of the shaft 10. The point $x$ is that center on the support 21 or spring 20 in the radius from the axis of the shaft or trunnion 10, which is effective, through the spring 20, to move the housings 11 or 12 a distance equal to the angular movement of the spring 20 and support 21 about the axis of the trunnion caused by any wheel or pair of wheels riding an obstruction (as shown in Fig. 7) or a depression; that is, when any wheel rides an unevenness, a thrust or pull will be imparted through the spring 20 to the support 21, so that the spring and support will be trunnioned on the shaft 10 an angular distance dependent on the rise or fall of the wheel measured from the normal, horizontal plane of the ground; such thrust or pull being imparted to these parts through the imaginary center $x$. If therefore, each of the pins 30 is disposed as above set forth, the compensating devices 27 will re-act on the axle housings 11, 12, (being connected thereto at that side of their axes opposite to the connection of the spring thereto) to prevent any torque movement thereof, and hence maintain the housings in horizontal position, as the members 20 rock on the trunnions 10, so that both of the respective driving and driven elements will remain in proper driving relation.

The effective center my be determined in various ways, for example by drawing a radius from the center of the shaft 10 in a vertical direction with the support 21 and spring in normal position; then rotating the axle housings a predetermined angular distance about the axis of the wheels 3' and then indicating on such radius the center which has moved a corresponding angular distance. The distance from this center $x$ to the axis of the shaft 10 determines the distance the pins 30 should be located from the same axis, at either side of and equal distances from such radius.

In my construction of axle mechanism, I provide two pairs of traction wheels which distribute the load over a wide area and these pairs of wheels are mounted on a pair of spaced members, which are trunnioned on the vehicle frame on a transverse shaft disposed between the pairs of wheels to permit them to move substantially vertically relative to each other or any of the wheels to move vertically relative to the remaining wheels, so that all of the wheels accommodate themselves to the unevenness of the ground, thereby securing two advantages, namely, lateral tilting effect on the vehicle frame is materially reduced and all of the wheels maintain tractive engagement with the ground while traversing uneven surfaces, and thus eliminates wheel spinning. Also, as will be noted, the members 20 serve (a) to transmit the tractive effort of the traction wheels to the vehicle frame and (b) to take driving torque re-action of the axle housings, also operate as the connecting members between the pairs of wheels to permit them to move vertically due to unevenness of the ground. Where these members constitute leaf springs, as shown, the vehicle frame is cushioned.

It will also be noted that the outer ends of the springs are connected to the axle housings at a point which lies in a vertical plane cutting the axes of the wheels, so that the weight of the vehicle frame or its load does not cause torque action on the axle housings.

Fig. 8 shows a construction embodying my invention but slightly modified in that the spring or connecting member, indicated at 20' and the compensating devices, indicated at 27' are reversed with respect to each other; and the support, indicated at 21' is turned 180° about the trunnion shaft 10, so as to trunnion the spring on the lower side thereof. In this arrangement the outer ends of the springs are connected to the lower side of the bolsters 18 but in the same relation to the axes of the wheels 3'.

Many changes in construction and widely differing embodiments and applications of the invention will suggest themselves to those skilled in this art without departing from the scope of the following claims, my disclosures herein being purely illustrative.

What I claim is:

1. In a vehicle, the combination of a frame, a pair of wheels at one end of said frame, and a multi-drive axle mechanism at the other end of said frame, said axle mechanism comprising pairs of traction wheels, axle housings having driving means for driving said wheels, a transverse shaft mounted on said frame between said axle housings, a pair of members trunnioned intermediate their ends on said shaft and pivotal connections between the free ends of said members and said axle housings, and compensating devices between said members and said axle housings connected to the latter substantially diametrically opposite to the connection to said members therewith, each said device being connected to the adjacent housing on one side of a plane cutting the axes of the adjacent wheels and said shaft and pivotally connected to the adjacent member on the opposite side of said plane.

2. In a vehicle, the combination of a frame, a pair of wheels at one end of said frame, and a multi-drive axle mechanism at the other end of said frame, said axle mechanism comprising pairs of traction wheels, axle housings having driving means for driving said wheels, a transverse shaft mounted on said frame, supports trunnioned on said shaft, a pair of members fixedly mounted intermediate their ends on said supports and pivotally connected at their free ends to said axle housings, each free end of each said member being connected to the adjacent housing on one side of a plane cutting the axis of the adjacent wheel and the axis of said shaft, and compensating devices between each said support and said axle housings, each device being connected at its outer end to the adjacent housing on the opposite side of the before mentioned plane and connected to the adjacent support on the first mentioned side of said plane.

3. In a vehicle, the combination of a frame, a pair of wheels at one end of said frame, and a multi-drive axle mechanism at the other end of said frame, said axle mechanism comprising pairs of traction wheels, axle housings having driving means for driving said wheels, a transverse shaft mounted on said frame, supports trunnioned on said shaft, a pair of members fixedly mounted intermediate their ends on said supports and pivotally connected at their free ends to said axle housings, and a compensating device connected to each said support and the adjacent axle housing at opposite sides of a plane cutting the axes of the adjacent wheels and said shaft, the connection of said device with said housing being at the opposite side of said plane from the connection of the adjacent member therewith.

4. In a vehicle, the combination of a frame, a pair of wheels at one end of said frame, and a multi-drive axle mechanism at the other end of said frame, said axle mechanism comprising pairs of traction wheels, axle housings having driving means for driving said wheels, a transverse shaft mounted on said frame, supports trunnioned on said shaft, a pair of members fixedly mounted intermediate their ends on said supports and pivotally connected at their free ends to said axle housings, and a compensating device connected to each said support and the adjacent axle housing at opposite sides of a plane cutting the axes of the adjacent wheels and said shaft, the connection of said device with said housing being at the opposite side of said plane from the connection of the adjacent member therewith, the connection of each device with said support and the effective center of said member lying in an arc struck from the axis of said shaft.

In testimony whereof, I have hereunto signed my name.

WILLIAM T. NORTON.